United States Patent [19]

Weemes et al.

[11] 4,219,628

[45] Aug. 26, 1980

[54] MOLDING COMPOSITION FROM POLYESTER BLENDS

[75] Inventors: Doyle A. Weemes, Greeneville; Robert W. Seymour, Kingsport, both of Tenn.

[73] Assignee: Eastman Kodak Company, Rochester, N.Y.

[21] Appl. No.: 26,482

[22] Filed: Apr. 2, 1979

[51] Int. Cl.² .................... C08L 23/16; C08L 67/02
[52] U.S. Cl. ............................ 525/166; 525/176; 525/177; 525/196
[58] Field of Search ............ 525/166, 176, 177, 196

[56] References Cited

U.S. PATENT DOCUMENTS

| | | | |
|---|---|---|---|
| 4,013,613 | 3/1977 | Abolins et al. | 525/176 |
| 4,122,061 | 11/1978 | Holub et al. | 525/176 |

FOREIGN PATENT DOCUMENTS 2139125 2/1973 Fed. Rep. of Germany ........... 525/166

*Primary Examiner*—J. Ziegler
*Attorney, Agent, or Firm*—Malcolm G. Dunn; Daniel B. Reece, III

[57] ABSTRACT

Polyester composition characterized by a balance of physical properties more suitable for molding purposes than possible with the polyesters themselves, including blends of a polyester, poly(ethylene-co-propylene) rubber (EPR) and an ionomer of poly(ethylene-co-acrylic acid); the polyesters being selected from poly(tetramethylene terephthalate) (PBT), poly(1,4-cyclohexylenedimethylene terephthalate) (PCDT), and poly(1,4-cyclohexylenedimethylene terephthalate) (PCDT) modified with up to about 10 percent by weight of poly(oxyethylene) glycol having a molecular weight of about 500 to about 2000.

5 Claims, No Drawings

MOLDING COMPOSITION FROM POLYESTER BLENDS

BACKGROUND OF THE INVENTION

The present invention is directed to a polyester composition resulting from a polyester blend, the polyester composition having a balance of properties more suitable for molding purposes than the polyester by itself.

There has been increased usage in recent years of thermoplastic polymers for molding useful articles. Presently there is a wide variety of articles molded from thermoplastic articles, the range extending from small articles to large articles, and from articles for low strength service to articles for high strength service.

One of the more desirable classes of thermoplastic polymers for molding articles for high strength service application is polyester. Polyesters are reasonable in cost, can be handled easily and can be molded with little difficulty.

Certain thermoplastic polyesters for molding articles for high strength service have proved to be most desirable. For instance one of the more desirable ones is poly(tetramethylene terephthalate) because this polyester exhibits a desirable overall balance of most mechanical properties such as tensile strength, flexural modulus and the like. The notched Izod impact strength, however, has been rather low and has thus been a factor limiting the use of poly(tetramethylene terephthalate) for some applications where higher impact strengths are required.

Another thermoplastic polyester is poly(1,4-cyclohexylenedimethylene terephthalate) as disclosed in U.S. Pat. No. 2,901,466. This thermoplastic polyester is an inherently brittle material, and processing of the material requires a high molding temperature ($\geq 290°$ C.) which can cause degradation and increased brittleness. These factors have prevented poly(1,4-cyclohexylenedimethylene terephthalate) from generally being useful as a thermoplastic molding composition.

Still another thermoplastic polyester having similar problems of brittleness and high temperature molding requirements is a modified poly(1,4-cyclohexylenedimethylene terephthalate), which is modified with up to about 10 percent by weight of poly(oxyethylene) glycol having a molecular weight of about 500 to about 2000.

An object of the invention, therefore, is to improve the usefulness of the thermoplastic polyester, poly(tetramethylene terephthalate), as a molding plastic by substantially increasing its notched Izod impact strength at room temperature and its unnotched Izod impact strength at low temperature, with only some loss of tensile strengths and flexural properties, although these latter properties are still at a desired acceptable level for molding purposes.

Another object of the invention is to make the use of the thermoplastic polyesters, poly(1,4-cyclohexylenedimethylene terephthalate) and the above-described modified poly(1,4-cyclohexylenedimethylene terephthalate) more attractive as molding plastics by increasing their notched Izod impact strengths and by substantially increasing their unnotched Izod impact strengths with only some loss in tensile strengths and flexural properties, although still also being at a desired acceptable level for molding purposes; and to lower the molding temperature requirements by about 20° C. to 30° C. at the same time.

Other objects inherent in the nature of the disclosed invention will become apparent to those skilled in the art to which this invention pertains.

For purposes of the description of this invention, the notched Izod impact test (ASTM D-256) indicates the energy required to break a notched specimen. The specimen, usually ⅛ inch by ½ inch by 2 inches, is clamped in the base of a pendulum testing machine so that it is cantilevered upward, with the notch facing the direction of impact. The notch has a radius of 0.010 inch. The pendulum is released and the force consumed in breaking the specimen is calculated from the height the pendulum reaches on the follow-through. The Izod impact test is calculated as foot-pounds per inch of notch. The Izod value is useful in comparing various types or grades of a plastic. It may indicate the need for avoiding sharp corners in parts made of materials that may prove to be notch sensitive.

The unnotched Izod impact test is the same as described above, with the exception that the specimen is not notched.

Also, for purposes of the description of this invention, the flexural modulus test is described in ASTM D-747; the tensile strength test in ASTM D-638; and the heat deflection temperature (HDT) in ASTM D-648.

SUMMARY OF THE INVENTION

The invention concerns the unexpected discovery that certain polyesters in combination with polyolefin rubbers and ionomers provide blends having a balance of properties more suitable for molding purposes than the polyesters by themselves, while retaining a high level of tensile strength and flexural properties. These blends are useful in molding applications where a high impact polyester is needed. The impact properties were also found to be superior to blends of polyester with either the polyolefin or with the ionomer.

The invention is thus directed to a polyester composition having a balance of properties suitable for molding purposes, with the balance of properties including a flexural modulus of at least 200,000 psi, a heat deflection temperature (HDT) at 264 psi of at least 50° C., a tensile strength of at least 5000 psi, a notched Izod impact strength at 23° C. of at least 0.7 foot-pounds per inch, an unnotched Izod impact strength at 23° C. of not break, and a Rockwell Hardness using the R scale of at least 90. The composition may be an admixture from about 70 to about 90 percent by weight of a polyester having an inherent viscosity of about 0.5 to about 1.5, the polyester being selected from (1) poly(tetramethylene terephthalate); (2) poly(1,4-cyclohexylenedimethylene terephthalate); and (3) poly(1,4-cyclohexylenedimethylene terephthalate) modified with up to about 10 percent by weight of poly(oxyethylene) glycol having a molecular weight of about 500 to about 2000; from about 25 to about 5 percent by weight of poly(ethylene-co-propylene) rubber having a melt flow at 230° C. ranging from about 0.1 to about 20.0 grams/10 minutes; and from about 5 to about 25 percent by weight of an ionomer of poly(ethylene-co-acrylic acid) with about 50 percent of the acrylic acid converted to a metal salt and having a melt index at 190° C. ranging from about 3 to about 20 grams/10 minutes.

For a more detailed description of the nature of and the preparation of poly(1,4-cyclohexylenedimethylene terephthalate), reference may be made to U.S. Pat. No. 2,901,466.

The admixture of the composition may also preferably be about 75 to about 85 percent by weight of the polyester, and at least 5 to about 20 percent by weight of the poly(ethylene-co-propylene) rubber, and at least 5 to about 20 percent by weight of the poly(ethylene-co-acrylic acid) such that the sum of the percents of poly(ethylene-co-propylene) rubber and poly(ethylene-co-acrylic acid) is between about 15 and about 25.

The poly(ethylene-co-propylene) rubber preferably has a melt flow at 230° C. of about 0.1 gram/10 minutes and comprises about 45 percent by weight ethylene and about 55 percent by weight propylene. This is a random copolymer with no order of sequence in which the ethylene or propylene appears in the chain.

The polyester of the most preferred composition may also be about 80 percent by weight of poly(tetramethylene terephthalate), about 10 percent by weight of poly(ethylene-copropylene) rubber and about 10 percent by weight of an ionomer of poly(ethylene-co-acrylic acid). This composition has a notched Izod impact strength at 23° C. of at least 1.5 foot-pounds per inch, and at −40° C. of at least 0.8 foot-pounds per inch, and an unnotched Izod impact strength at −40° C. of no break.

DESCRIPTION OF THE PREFERRED EMBODIMENT

The "ionomers" mentioned herein broadly refer to a family of thermoplastic materials created by chemically linking metal ions to ethylene polymers containing acid groups. An ionomer is a physically crosslinked polymer in which the linkages are ionic associations. The ionomers represent a new class of hydrocarbon polymers which combine desirable solid state properties of crosslinked hydrocarbon polymers with melt flow properties of uncrosslinked hydrocarbon polymers. The ionomer is termed an "ionic copolymer" comprising a polymer of an α-olefin and an α, β-ethylenically unsaturated carboxylic acid with at least 50 percent of the carboxylic acid groups being neutralized by reaction with an ionizable metal compound. For a more detailed description of ionic copolymers and how they are made, reference may be made to U.S. Pat. No. 3,264,272, which is assigned to E. I. du Pont de Nemours and Company.

The ionomer useful in this invention is poly(ethylene-co-acrylic acid) with about 50 percent of the acid converted to a metal salt, for example, sodium.

More specifically, the ionomers employed herein have a melt index at 190° C. ranging from about 3 to about 201 grams/10 minutes.

Still more specifically, the particular ionomers used herein are described in the Facts Sheet issued by Du Pont on SURLYN A ionomer resin, the major constituent of which is indicated as being ethylene. The Facts Sheet is further identified on one side in the lower left-hand corner as "A-50108".

The polyesters useful in this invention are homo- or copolyesters having inherent viscosities (I.V.) of 0.6 to 1.6, as determined by a concentration of 0.5% of the polymer in the solvent (60% by weight phenol and 40% by weight tetrachloroethane), the polymer being dissolved at 125° C. and measured at 25° C. The dibasic acid component is terephthalic acid or a mixture of terephthalic acid with isophthalic acid. The acid component may be further modified with less than 50 mole percent of an aliphatic or aromatic dicarboxylic acid. The major glycol components are chosen from monomeric aliphatic or cyclo-aliphthalic compounds such as 1,4-butanediol, 1,4-cyclohexanedimethanol, or ethylene glycol. The glycol component may also contain a minor amount (less than 25 weight percent) of a polymeric glycol such as those based on polypropylene oxide or poly(oxytetramethylene).

The polyester molding composition may contain about 5 to about 25 weight percent poly(ethylene-co-propylene) rubbers, and about 5 to about 25 weight percent poly(ethylene-co-acrylic acid).

The invention can be further illustrated by the following examples of preferred embodiments, although it will be understood that these examples are included merely for purposes of illustration and are not intended to limit the scope of the invention.

EXAMPLE 1

The materials used in these blends were a poly(tetramethylene terephthalate) (PBT) polyester having an inherent viscosity (I.V.) of 1.11 and a density of 1.296; Royalene 7400 [poly(45-ethylene-co-55-propylene) rubber] (EPR), a product of Uniroyal, and having a melt flow at 230° C. of 0.1 and a density of 0.865; and SURLYN ionomer 1555 [poly(ethylene-co-acrylic acid)], a product of Du Pont. These blends were melt compounded in a Brabender extruder at about 250° C. and molded in a Newbury machine at about 250° C.

In reference to Table 1 below, the blends containing only the polyester, poly(tetramethylene terephthalate) (PBT) and either ethylene propylene rubber (EPR) or ionomer had slightly improved notched Izod impact strengths relative to the control, i.e., the polyester by itself.

The blend, however, of the polyester (PBT), EPR and ionomer, had an unexpectedly improved notched Izod impact strength (1.6 ft.lb./in. at 23° C.) compared to the control or to the control with either EPR or ionomer, as may be noted from Table 1, and an improved percent elongation at break.

EXAMPLE 2

The materials used in these blends were poly(1,4-cyclohexylenedimethylene terephthalate) (PCDT) polyester having an inherent viscosity (I.V.) of 0.70 and a density of 1.210; Royalene 7400 [poly(45-ethylene-co-55-propylene) rubber] (EPR), a product of Uniroyal, and having a melt flow at 230° C. of 0.1 and a density of 0.865; and SURLYN ionomer 1555 [poly(ethylene-co-acrylic acid)], a product of Du Pont. These blends were compounded and molded at 265° C. using methods as described in Example 1.

In reference to Table 2 below, the blends containing only the polyester, poly(1,4-cyclohexylenedimethylene terephthalate) (PCDT) and either ethylene propylene rubber (EPR) or ionomer had slightly improved notched Izod impact strength and unnotched Izod impact strength relative to the control, i.e., the polyester by itself, but in both instances the impact strengths were still inferior for molding purposes.

The blend, however, of the polyester (PCDT), EPR and ionomer has improved notched Izod impact and unnotched Izod impact strengths, as compared to the control or the control plus EPR or the control plus ionomer, as may be noted from Table 2.

EXAMPLE 3

The materials used in these blends were a modified poly(1,4-cyclohexylenedimethylene terephthalate)

polyester (PCDT) having an inherent viscosity of 0.79 and a density of 1.218; Royalene 7400 [poly(45-ethylene-co-55-propylene) rubber] (EPR), a product of Uniroyal, and having a melt flow at 230° C. of 0.1 and a density of 0.865; and SURLYN ionomer 1555 [poly(ethylene-co-acrylic acid)], a product of Du Pont. These blends were compounded and molded at 265° C. using methods as described in Example 1.

In reference to Table 3 below, the blends containing only the polyester, the modified poly(1,4-cyclohexylenedimethylene terephthalate) (PCDT) (as modified with up to about 10 percent by weight of poly(oxyethylene) glycol having a molecular weight of about 500 to about 2000) and either ethylene propylene rubber (EPR) or ionomer also had slightly improved notched Izod impact strength and unnotched Izod impact strength relative to the control, i.e., the polyester by itself, but in both instances the impact strengths were still inferior for molding purposes.

The blend, however, of the modified polyester (PCDT), EPR and ionomer has improved notched Izod impact strengths, as may be noted from Table 3, with the unnotched Izod impact strength at 23° C. increasing to no break.

Table 1

MECHANICAL PROPERTIES OF POLY(TETRAMETHYLENE TEREPHTHALATE) (PBT) POLYESTER BLENDS

| Property | $PBT^a$ Control | $PBT^a$/Ionomer$^c$ (70/30 wt. %) | $PBT^a$/EPR$^d$ (80/20 wt. %) | $PBT^a$/EPR$^d$/Ionomer$^c$ (80/10/10 wt. %) |
|---|---|---|---|---|
| Izod Impact, ft. lb./in. | | | | |
| Notched, 23/−40° C. | 0.7/0.6 | 0.9/0.6 | 1.1/0.76 | 1.6/0.9 |
| Unnotched, 23/−40° C. | $NB^b$/25 | 14/19 | $NB^b$/25 | $NB^b$/NB |
| Flexural Modulus, $10^5$ psi | | | | |
| (ASTM D-747) | 3.37 | 2.61 | 2.24 | 2.54 |
| Tensile Strength, psi | | | | |
| (ASTM D-638) | 8104 | 5700 | 4682 | 5807 |
| % Elongation at Break | 38 | 35 | 36 | 46 |
| HDT at 264 psi, °C.* | | | | |
| (ASTM D-648) | 61.0 | 52.0 | 56.0 | 54.5 |
| Hardness, R/L** | 119/110 | 100/60 | 91/34 | 97/58 |

*Heat Deflection Temperature
**Rockwell hardness using R and L scales
$PBT^a$ = poly(tetramethylene terephthalate) having inherent viscosity (I.V.) of 1.11
$NB^b$ = No break
Ionomer$^c$ = poly(ethylene-co-arcylic acid) or Surlyn Ionomer 1555, a product of Du Pont
$EPR^d$ = ethylene propylene rubber (Royalene 7400, a product of Uniroyal) = poly(45-ethylene-co-55-propylene) rubber

Table 2

MECHANICAL PROPERTIES OF POLY(1,4-CYCLOHEXYLENEDIMETHYLENE TEREPHTHALATE) (PCDT)

| Property | $PCDT^e$ Control | $PCDT^e$/Ionomer (70/30 wt. %) | $PCDT^e$/EPR (80/20 wt. %) | $PCTD^e$/EPR/Ionomer (90/10/10 wt. %) |
|---|---|---|---|---|
| Izod Impact, ft. lb./in. | | | | |
| Notched, 23/−40° C. | 0.57/0.7 | 0.6/0.5 | 0.58/0.8 | 0.9/0.7 |
| Unnotched, 23/−40° C. | 8.0/7.0 | 10.0/7.0 | 10.0/6.0 | NB/12.0 |
| Flexural Modulus, $10^5$ psi | | | | |
| (ASTM D-747) | 3.07 | 1.90 | 1.95 | 2.10 |
| Tensile Strength, psi | | | | |
| (ASTM D-638) | 7200 | 4800 | 5200 | 5900 |
| % Elongation at Break | 4 | 4 | 12 | 15 |
| HDT at 264 psi, °C. | 95.0 | 65.0 | 70.0 | 73.0 |
| Hardness, R/L | 103/— | 98/— | 98/— | 102/— |

$PCDT^e$ = poly(1,4-cyclohexylenedimethylene terephthalate) having inherent viscosity (I.V.) of 0.70

Table 3

MECHANICAL PROPERTIES OF MODIFIED POLY(1,4-CYCLOHEXYLENEDIMETHYLENE TEREPHTHALATE) (PCDT)

| Property | $PCDT^f$ Control | $PCDT^f$/Ionomer (70/30 wt. %) | $PCDT^f$/EPR (80/20 wt. %) | $PCDT^f$/EPR/Ionomer (80/10/10 wt. %) |
|---|---|---|---|---|
| Izod Impact, ft. lb./in. | | | | |
| Notched, 23/−40° C. | 0.57/0.37 | 0.60/0.50 | 0.58/0.47 | 0.75/0.42 |
| Unnotched, 23/−40° C. | 12.1/15.4 | 26.0/15.0 | 25.5/13.4 | NB/18.6 |
| Flexural Modulus, $10^5$ psi | | | | |
| (ASTM D-747) | 2.80 | 1.79 | 1.89 | 2.05 |
| Tensile Strength, psi | | | | |
| (ASTM D-638) | 5876 | 3425 | 4468 | 5366 |
| % Elongation at Break | 7 | 3 | 15 | 17 |
| HDT at 264 psi, °C. | — | 59.0 | 65/0 | 70.0 |
| Hardness, R/L | 117/92 | 96/60 | 94/46 | 102/63 |

$PCDT^f$ = poly(1,4-cyclohexylenedimethylene terephthalate) modified with up to about 10 percent by weight of poly(oxyethylene) glycol haing a molecular weight of about 500 to about 2000 and having inherent viscosity (I.V.) of 0.79

With respect to Examples 1, 2 and 3 above and in reference to Tables 1, 2 and 3, it will be noted that there is some loss of modulus and tensile properties in order to achieve the higher impact strengths with the blends of the invention, but that the flexural modulus and tensile properties shown are still deemed quite acceptable for molding compositions. Note, for instance, that the unnotched Izod impact strengths at 23° C. for the blends involving both PCDT and modified PCDT increased significantly to "no break," and that the blend involving PBT had a significant increase in unnotched Izod impact strength at −40° C. to "no break."

For a blend, therefore, including any of the polyesters disclosed herein, the polyesters may constitute about 70 to about 90 percent of the admixture, while the poly(ethylene-copropylene rubber) (EPR) may constitute about 25 to about 5 percent by weight and the ionomer of poly(ethylene-co-acrylic acid may constitute about 5 to about 25 percent by weight.

The polyesters may preferably constitute about 75 to about 85 percent by weight, while the EPR may preferably constitute at least 5 to about 20 percent by weight, and the ionomer may preferably constitute at least 5 to about 20 percent by weight with the sum of the percents of the EPR and ionomer being between about 15 and about 25.

The total additive of EPR and ionomer to a polyester, such as poly(tetramethylene terephthalate) (PBT), in a most preferred blend is about 20 percent by weight as may be noted from Table 1.

Table 4 below, illustrates the notched Izod impact properties at 23° C. when the additive of EPR and ionomer to the polyester blend is 37.5 percent by weight. Table 4 is outside the scope of the present invention and illustrates that in this composition range a higher impact can be obtained with a blend of PBT and EPR than with a blend of PBT, EPR and ionomer. This is opposite to what occurs within the scope of the invention where the highest impact strength is obtained with a PBT blend containing both EPR and ionomer. Further, while the impact strengths of some compositions outside the scope of the present invention are good, they have undesirably low values of flexural modulus, being below 200,000 psi.

Table 4

37.5 Percent by Weight Additive to PBT

| EPR % | Ionomer % | Notched Izod, 23° C. | Flexural Modulus $10^5$ psi |
|---|---|---|---|
| 37.5 | 0 | 10.50 ft.lb./in. | 1.45 |
| 0 | 37.5 | 0.71 ft.lb./in. | 1.69 |
| 25.0 | 12.5 | 6.20 ft.lb./in. | 1.80 |
| 12.5 | 25.0 | 1.40 ft.lb./in. | 1.67 |

Table 5 below is for comparison purposes to show the physical properties of poly(tetramethylene terephthalate) (PBT) polyester by itself; in a blend with either the EPR or the ionomer; or in a blend of EPR and ionomer, and within and without the claimed amounts. The enclosed boxed area shows the polyester composition within the scope of the invention.

Table 5

NOTCHED IZOD IMPACT DATA ON PBT BLENDS

| EPR Wt. % | Ionomer Wt. % | Notched Izod Impact Ft.lb./in., 23/−40° C. | Flexural Modulus $10^5$ psi |
|---|---|---|---|
| 0.0 | 0.0 | 0.80/0.60 | 3.00 |
| 10.0 | 0.0 | 0.94/0.74 | 2.24 |
| 12.5 | 0.0 | 1.00/0.63 | 2.46 |
| 20.0 | 0.0 | 1.10/0.76 | 2.24 |
| 25.0 | 0.0 | 1.40/0.75 | 2.09 |
| 30.0 | 0.0 | 1.40/1.50 | 1.80 |
| 10.0 | 10.0 | 1.60/0.90 | 2.54 |
| 7.5 | 7.5 | 1.30/0.67 | 2.73 |
| 15.0 | 5.0 | 1.40/0.90 | 2.56 |
| 5.0 | 15.0 | 1.30/0.79 | 2.73 |
| 15.0 | 15.0 | 2.30/1.04 | 2.21 |
| 0.0 | 12.5 | 0.96/0.67 | 2.87 |
| 0.0 | 25.0 | 0.96/0.75 | 2.38 |
| 0.0 | 37.5 | 0.71/0.47 | 1.69 |

The inherent viscosity (I.V.) of the polyester, poly(tetramethylene terephthalate) (PBT), may range from about 0.6 to about 1.5 while the inherent viscosity of the polyesters, poly(1,4-cyclohexylenedimethylene terephthalate) (PCDT) and modified poly(1,4-cyclohexylenedimethylene terephthalate) (PCDT) may range from about 0.5 to about 0.9. Substituting poly(ethylene-co-propylene) containing small concentrations of dienes for the EPR is possible. It is expected that other ethylene-acrylic acid ionomers may be useful in this invention other than SURLYN ionomer resin. It is also possible to add coloring agents, stabilizers, and processing acids normally used in molding plastics without detracting from the good mechanical properties of the blends.

Due to the balance of properties including increased notched Izod impact strength of the blends disclosed in this invention, the blends will perform well in injection molding applications where greater impact strength is required, such as for protective welding face shields and masks, to mention only a few examples.

The invention has been described in detail with particular reference to preferred embodiments thereof, but it will be understood that variations and modifications can be effected within the spirit and scope of the invention.

We claim:

1. A polyester composition having a balance of properties suitable for molding purposes, said balance of properties including a flexural modulus of at least 200,000 psi, a heat deflection temperature at 264 psi of at least 50° C., a tensile strength of at least 5000 psi, a notched Izod impact strength at 23° C. of at least 0.7 foot-pounds per inch, an unnotched Izod impact strength at 23° C. of no break, and a Rockwell Hardness using the R scale of at least 90; said polyester composition comprising an admixture of (A) from about 70 to about 90 percent by weight of a polyester having an inherent viscosity of about 0.5 to about 1.5, and selected from
(1) poly(tetramethylene terephthalate),
(2) poly(1,4-cyclohexylenedimethylene terephthalate), and
(3) poly(1,4-cyclohexylenedimethylene terephthalate) modified with up to about 10 percent by weight of poly(oxyethylene) glcyol having a molecular weight of about 500 to about 2000.

(B) from about 25 to about 5 percent by weight of poly(ethylene-co-propylene) rubber having a melt flow at 230° C. ranging from about 0.1 to about 20.0 grams/10 minutes, and (C) from about 5 to about 25 percent by weight of an ionomer of poly(ethylene-co-acrylic acid) with about 50 percent of the acrylic acid converted to a metal salt and having a melt index at 190° C. ranging from about 3 to about 20 grams/10 minutes.

2. A polyester composition as defined in claim 1, wherein said admixture comprises about 75 to about 85 percent by weight of said polyester, at least 5 to about 20 percent by weight of said poly(ethylene-co-propylene) rubber, and at least 5 to about 20 percent by weight of said poly(ethylene-co-acrylic acid) such that the sum of the percents of poly(ethylene-co-propylene) rubber and poly(ethylene-co-acrylic acid) is between about 15 and about 25.

3. A polyester composition as defined in claim 1, wherein said poly(ethylene-co-propylene) rubber has a melt flow at 230° C. of about 0.1 gram/10 minutes and comprises about 45 percent by weight ethylene and about 55 percent by weight propylene.

4. A polyester composition as defined in claim 2, wherein said polyester comprises about 80 percent by weight of poly(tetramethylene terephthalate), said poly(ethylene-co-propylene) rubber comprises about 10 percent by weight and said ionomer comprises about 10 percent by weight.

5. A polyester composition as defined in claim 1, wherein the polyester of said admixture is said poly(tetramethylene terephthalate), said composition having a notched Izod impact strength at 23° C. of at least 1.5 foot-pounds per inch and at −40° C. of at least 0.8 foot-pounds per inch, and an unnotched Izod impact strength at −40° C. of no break.

* * * * *